US011635165B2

(12) United States Patent
McLain et al.

(10) Patent No.: US 11,635,165 B2
(45) Date of Patent: Apr. 25, 2023

(54) REMOTE VIDEO INSPECTION SYSTEM

(71) Applicant: Frontier Electronic Systems Corp., Stillwater, OK (US)

(72) Inventors: Kurt Ashley McLain, Stillwater, OK (US); Scott Andrew Briggs, Stillwater, OK (US)

(73) Assignee: Frontier Electronic Systems Corporation, Stillwater, OK (US)

( * ) Notice: Subject to any disclaimer, the term of this patent is extended or adjusted under 35 U.S.C. 154(b) by 0 days.

(21) Appl. No.: 16/518,661

(22) Filed: Jul. 22, 2019

(65) Prior Publication Data

US 2019/0349511 A1 Nov. 14, 2019

Related U.S. Application Data

(62) Division of application No. 15/727,461, filed on Oct. 6, 2017, now abandoned.

(60) Provisional application No. 62/405,012, filed on Oct. 6, 2016.

(51) Int. Cl.
| | |
|---|---|
| *F16M 11/12* | (2006.01) |
| *H04N 23/66* | (2023.01) |
| *H04N 23/54* | (2023.01) |
| *H04N 23/69* | (2023.01) |
| *H04N 23/661* | (2023.01) |
| *G06T 7/00* | (2017.01) |

(52) U.S. Cl.
CPC .......... *F16M 11/123* (2013.01); *H04N 23/54* (2023.01); *H04N 23/66* (2023.01); *H04N 23/661* (2023.01); *H04N 23/69* (2023.01); *G06T 7/0004* (2013.01); *G06T 2207/30141* (2013.01)

(58) Field of Classification Search
CPC .......... H04N 5/23203; H04N 5/23206; H04N 5/232; H04N 5/225; H04N 5/2253; H04N 5/23296; H04N 5/23299; F16M 11/04; F16M 11/06; F16M 11/12; F16M 11/121; F16M 11/123; F16M 11/18; G01N 2021/95638; G01N 2021/8461; G01N 21/88; G01N 21/8803; G06T 2207/30141; G06T 7/0002; G06T 7/0004
See application file for complete search history.

(56) References Cited

U.S. PATENT DOCUMENTS

2014/0063485 A1* 3/2014 Palmieri ................ G01N 21/87
356/30
2015/0346108 A1* 12/2015 Palmieri ................ G01N 21/87
356/30

\* cited by examiner

*Primary Examiner* — Clayton E. LaBalle
*Assistant Examiner* — Fang-Chi Chang
(74) *Attorney, Agent, or Firm* — Martin S. High, P.C.

(57) ABSTRACT

The embodiments of the Remote Video Inspection System comprise a remote video inspection hardware assembly and a video inspection software system. The remote video inspection hardware assembly is comprised of a camera and a stage assembly. The stage assembly is comprised of a horizontal gimbal, an outer gimbal, and an inner gimbal, a base plate, and a component table. The video inspection software system is comprised of both a local and remote component. The local component is operated by a technician who oversees the remote inspection, and allows for setup, manual positioning, and manual camera adjustment. The remote component is operated by an inspector, and provides video feed to them, as well as a system to control the viewing angle and position of the component/camera.

14 Claims, 4 Drawing Sheets

REMOTE VIDEO INSPECTION SYSTEM

STATEMENT REGARDING FEDERALLY SPONSORED RESEARCH OR DEVELOPMENT

Not applicable

FIELD OF THE EMBODIMENTS

The field of the embodiments is video inspection gear. More specifically, the embodiments are directed to the use of video inspection of a printed wire board and other electronic devices at a remote location for inspection purposes.

BACKGROUND OF THE EMBODIMENTS

There are numerous instances in industrial practice that inspection of components is required. This is also true in the electronic component industry. Visual inspection has long been a required step in any quality control procedure. In many cases the manufacturer must have visual inspection performed by the customer of the project. This is particularly true in the aerospace industry where visual inspection of the components is a requirement of the final customer. In the past, this inspection required the customer to travel to the location of the manufacturer to inspect the product and the process. This is a costly process, requiring travel expenditure for a few people to perform the visual inspection. The overall purpose of the embodiments described herein is to provide a remote video inspection system that will save significant costs and improve the quality of visual inspections.

SUMMARY OF THE EMBODIMENTS

The embodiments of the Remote Video Inspection System are comprised of a remote video inspection hardware assembly and a remote video inspection software system. The hardware assembly is comprised of a video camera, an adjustable video camera mount, magnification control of the camera, and a means to view the component from varying positions and angles. The video inspection software system is comprised of both a local and remote component. The local component is operated by a technician who oversees the remote inspection, and allows for setup, manual positioning, and manual camera adjustment. The remote component is operated by an inspector, and provides video feed to them, as well as a system to control the viewing angle and position of the component and camera. In addition, the remote component can be viewed by multiple clients, though only the inspector has control of viewing angle and position.

There has thus been outlined, rather broadly, the more important features of the embodiments of the Remote Video Inspection System in order that the detailed description thereof that follows may be better understood, and in order that the present contribution to the art may be better appreciated. There are, of course, additional features of the embodiments that will be described hereinafter and which will form the subject matter of the claims appended hereto.

In this respect, before explaining at least one embodiment of the embodiments in detail, it is to be understood that the embodiment is not limited in this application to the details of construction and to the arrangements of the components set forth in the following description or illustrated in the drawings. The embodiment or embodiments are capable of other embodiments and of being practiced and carried out in several ways. Also, it is to be understood that the phraseology and terminology employed herein are for the purpose of description and should not be regarded as limiting. As such, those skilled in the art will appreciate that the conception, upon which this disclosure is based, may readily be used as a basis for the designing of other structures, methods and systems for carrying out the several purposes of the embodiments. Additional benefits and advantages of the embodiments will become apparent in those skilled in the art to which the present embodiments relate from the subsequent description of the preferred embodiment and the appended claims, taken in conjunction with the accompanying drawings. It is important, therefore, that the claims be regarded as including such equivalent constructions insofar as they do not depart from the spirit and scope of the embodiments.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

DETAILED DESCRIPTION OF THE PREFERRED EMBODIMENTS

Figure 1A:
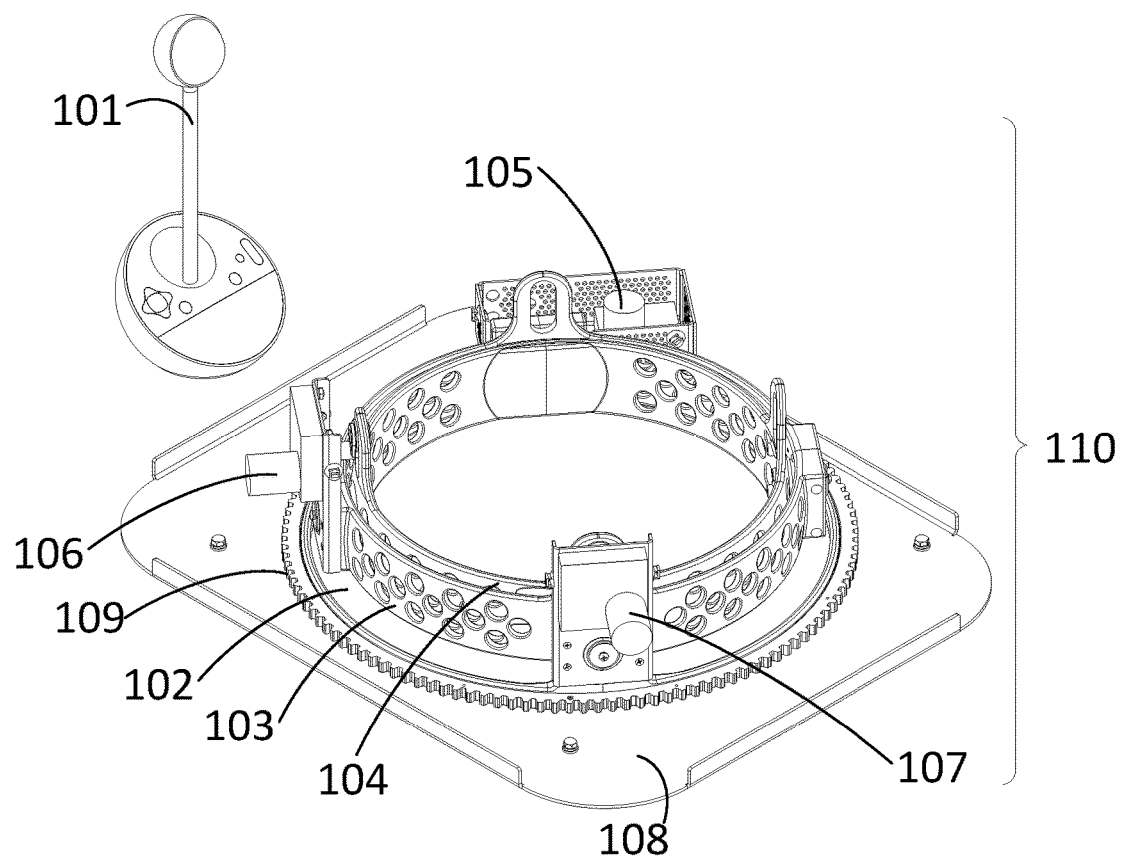
FIG. 1A is a perspective view of an embodiment of the Remote Video Inspection System.
Figure 1B:
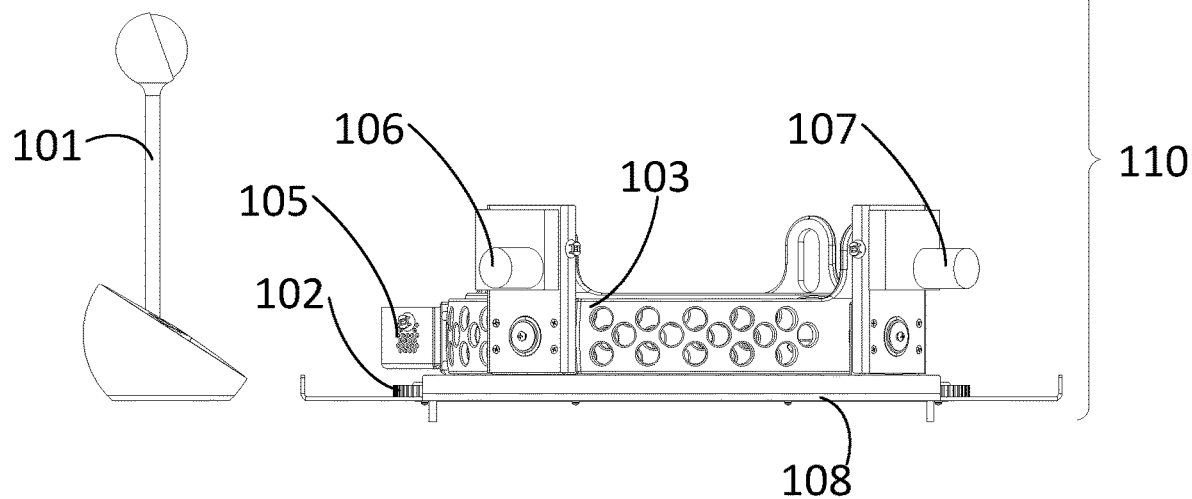
FIG. 1B is a side view of an embodiment of the Remote Video Inspection System.
Figure 2:
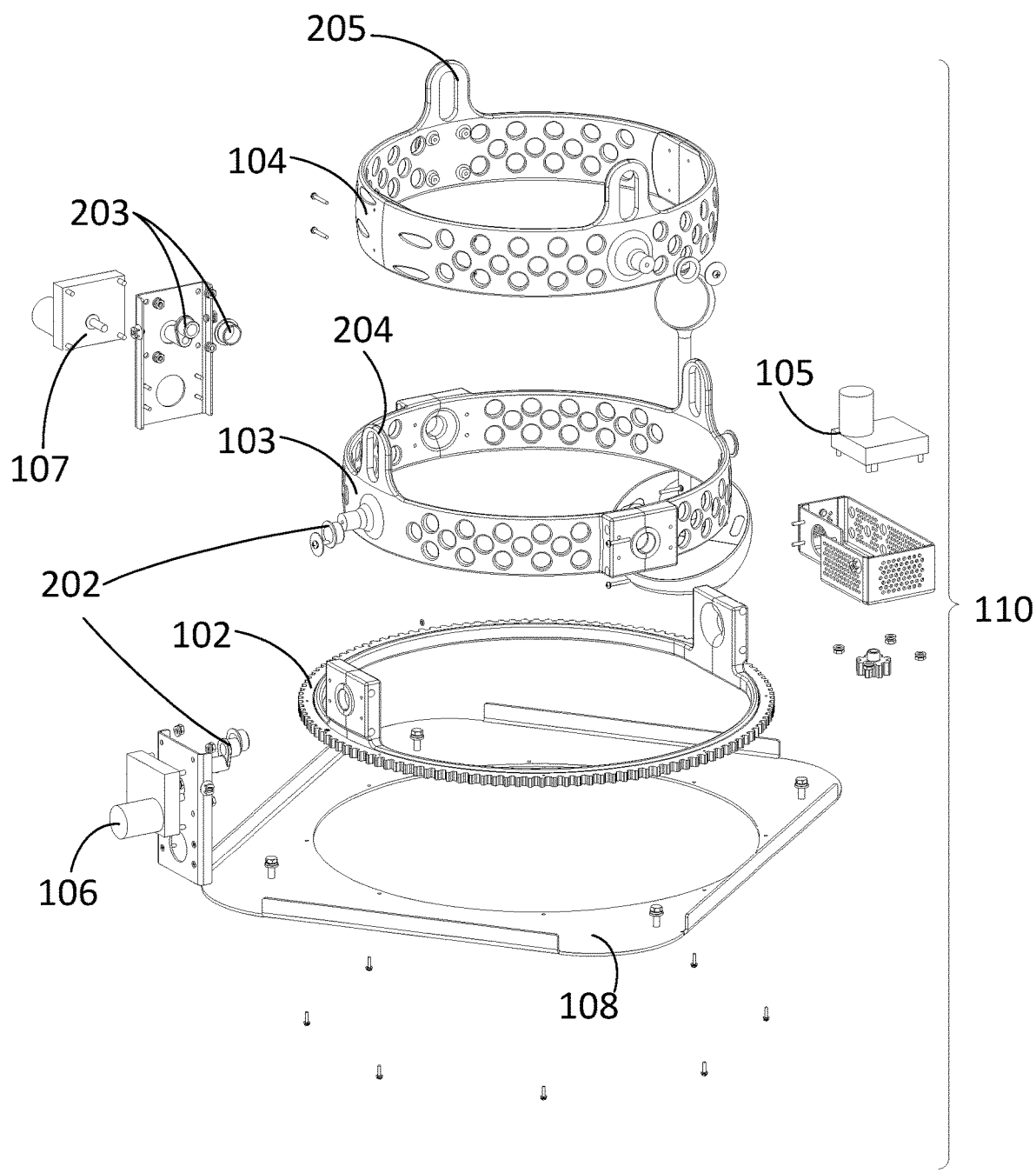
FIG. 2 is an exploded view of an embodiment of the Remote Video Inspection
System.
Figure 3:
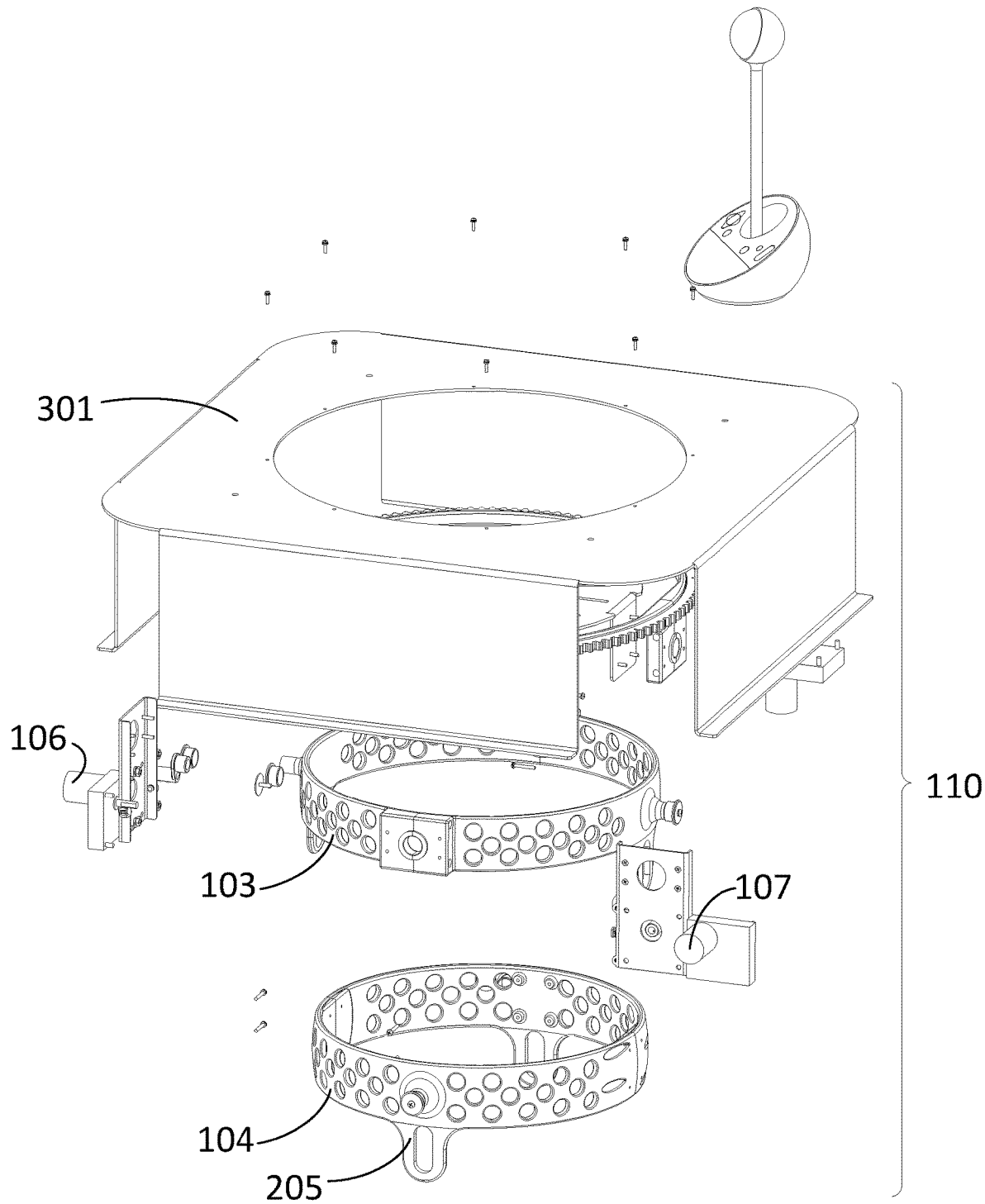
FIG. 3 is an exploded view of an embodiment of the Remote Video Inspection System showing the component table.
Figure 4:
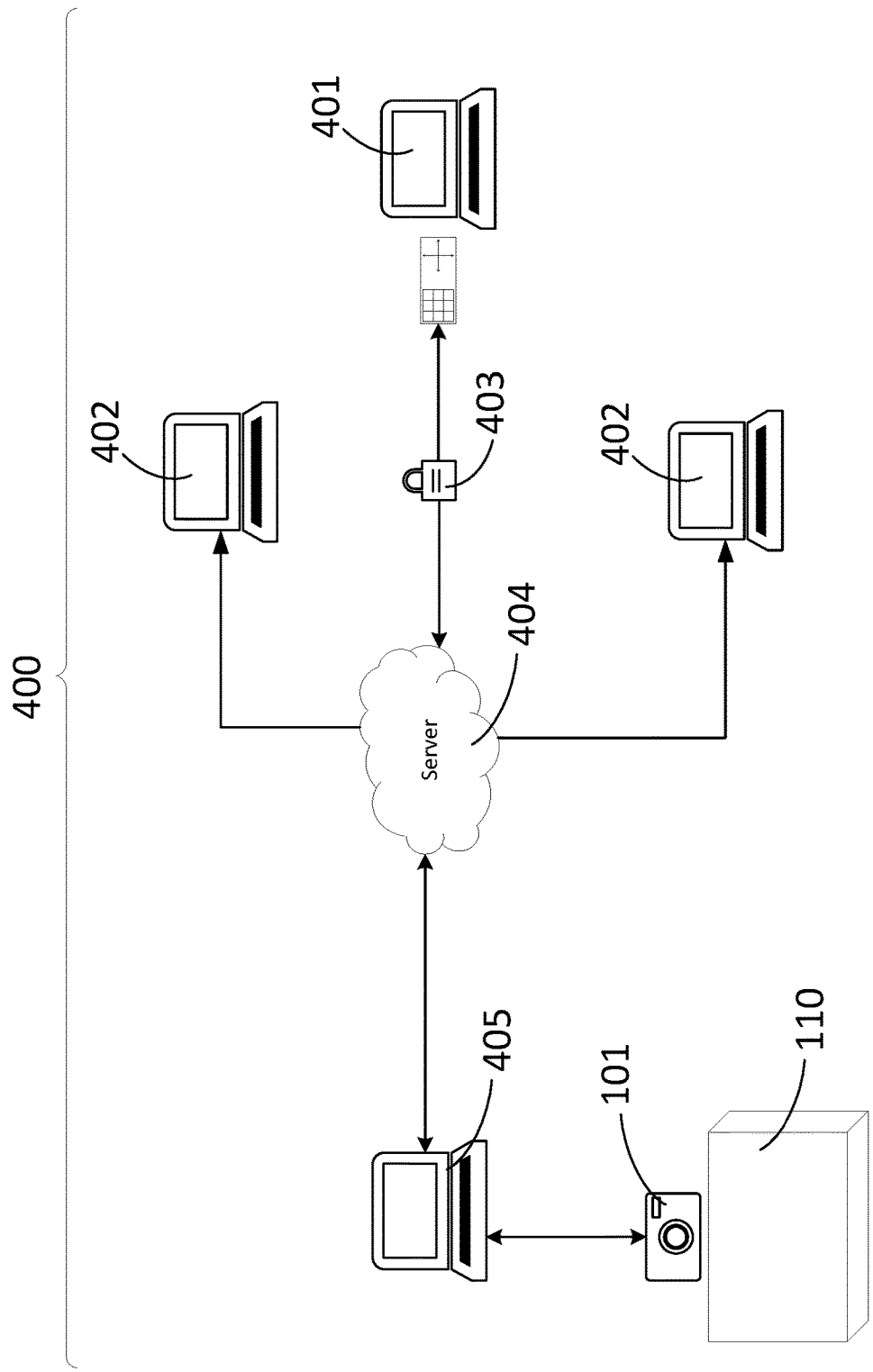
FIG. 4 is a schematic view of an embodiment of the Remote Video Inspection System showing the video inspection software system and the remote video inspection hardware assembly.

Embodiments of the Remote Video Inspection System comprise a remote video inspection hardware assembly 110 and a video inspection software system 400.

The remote video inspection hardware assembly 110 is comprised of a camera 101 and a stage assembly 110.

The stage assembly 110 is comprised of a horizontal gimbal 102, an outer gimbal 103, and an inner gimbal 104, a base plate 108, and a component table 301.

The camera 101 is a video camera with zoom, pan, and tilt capability. The camera is located adjacent to stage assembly 110 and is used to view any object mounted on the stage assembly 110.

The horizontal gimbal 102, outer gimbal 103, and inner gimbal 104 are combined to provide three axes of rotation so that a component to be viewed and mounted on the component table 301 can be oriented in any direction. The angular ranged of the horizontal gimbal 102 is 360 degrees (360°. The angular range of the outer gimbal 103, and inner gimbal 104 is 90 degrees) (90°).

The horizontal gimbal 102 is comprised of a gear ring 109 and a horizontal gimbal motor 105. The horizontal gimbal motor 105 provides power to the gear ring 109 based on signals received from the video inspection software system to place the component to be viewed in the proper orientation.

The outer gimbal 103 is comprised of an outer gimbal motor 106. The outer gimbal 103 is mechanically connected to the outer gimbal motor via an outer gimbal cam 202. The outer gimbal motor 106 provides power to the outer gimbal 103 based on signals received from the video inspection software system to place the component to be viewed in the proper orientation.

In an analogous manner, the inner gimbal 104 is comprised of an inner gimbal motor 107. The inner gimbal 104 is mechanically connected to the inner gimbal motor 107 via an inner gimbal cam 203. The inner gimbal motor 107 provides power to the inner gimbal 104 based on signals received from the video inspection software system to place the component to be viewed in the proper orientation. The inner gimbal 104 forms an inner gimbal cam aperture.

Alternatively, a component table 301 is affixed to the base plate 108 via fasteners. The base plate 108 is in turn affixed to the horizontal gimbal 102 via fasteners. The stage assembly 110 can be affixed to a support of any kind in any orientation via the component table 301.

The video inspection software system 400 is comprised of local and remote components. The remote component of the video inspection software system 400 is comprised of one or more remote client with inspection controls 401, one or more remote viewing interfaces 402, and a log-in system 403. The local component of the video inspection software system 400 is comprised of a local controller 405 at the location of the component to be viewed wherein the controller 405 is in turn connected via a video connection to the camera 101 and to the horizontal gimbal motor 105, the outer gimbal motor 106, and the inner gimbal motor 107. The remote client with inspection controls 402 allows a remote user to view the video signal from the camera 101 and control the position of the component stage assembly 110 through interactive controls on the user interface. The one or more remote viewing interfaces 402 allows a remote user to view the video without controlling the local hardware system.

One use of Remote Video Inspection System is to inspect a printed wiring board (PWB). However, it should be emphasized that the Remote Video Inspection System can be used to remotely view any device or project that should be inspected. In the inspection of PWBs the system will accommodate a PWB with dimensions up to that of 17 inches wide by 19 inches long and with components 3 inches deep, a video camera that can capture images from various angles, wherein the video camera is capable of adjustments to orientation and field of view; and wherein the hardware assembly provides a platform on which to view the inspection component from varying positions and angles.

The Remote Video Inspection System can be used to observe the fit of a PWB into a chassis while the board is being installed. As another example, the Remote Video Inspection System can be used to observe the installation of components and the torque and force loading on components during installation. In another example, the Remote Video Inspection System can be used to inspect the conformance of solder joints relative to defined standards such as JSTD 001 and NASA Standard 8739 et seq.

The video inspection software system 401 is further comprised of a local and remote camera control means, means to pre-program camera movements so the same views can be captured on multiple boards, a local and remote camera magnification control means, a recording means for video, a means to automatically reference components on the video with a corresponding Computer Aided Design (CAD) electrical design and schematics; PWB safety means so that the Remote Video Inspection hardware assembly is incapable of touching the PWB, and wherein the Remote Video Inspection software can be interfaced with a remote system over the internet.

What is claimed is:

1. A remote video inspection system comprised of a remote video inspection hardware assembly, local and remote components, and video inspection software system; wherein the remote video inspection hardware assembly is comprised of a camera and a stage assembly; wherein the stage assembly is comprised of a horizontal gimbal, an outer gimbal, and an inner gimbal, a base plate, a component table; wherein the remote component of the video inspection software system is comprised of one or more remote clients with inspection controls, one or more remote viewing interfaces, and a log-in system; wherein the angular range of the horizontal gimbal is 360 degrees)(360°); wherein the angular range of the outer gimbal, and inner gimbal is 90 degrees)(90°); wherein the inner gimbal forms an inner gimbal cam aperture; wherein the camera is able to zoom, pan, and tilt; and wherein the local component is comprised of a local controller; wherein at the location of the component to be viewed.

2. The remote video inspection system described in claim 1 comprising and a means to automatically reference components on the video with a corresponding Computer Aided Design (CAD) electrical design and schematics wherein the horizontal gimbal, outer gimbal, and inner gimbal are combined to provide three axes of rotation.

3. The remote video inspection system described in claim 2 wherein the horizontal gimbal is comprised of a gear ring and a horizontal gimbal motor that provides power to the gear ring based on signals received from the video inspection software system.

4. The remote video inspection system described in claim 3 wherein the outer gimbal is comprised of an outer gimbal motor that is mechanically connected to the outer gimbal motor via an outer gimbal cam and where the outer gimbal motor provides power to the outer gimbal based on signals received from the video inspection software system.

5. The remote video inspection system described in claim 4 wherein the inner gimbal is comprised of an inner gimbal motor that is mechanically connected to the inner gimbal motor via an inner gimbal cam and where the inner gimbal motor provides power to the inner gimbal based on signals received from the video inspection software system.

6. The remote video inspection system described in claim 5 wherein the local controller is connected via a video connection to the camera and to the horizontal gimbal motor, the outer gimbal motor, and the inner gimbal motor.

7. The remote video inspection system described in claim 6 wherein the remote client with inspection controls allows a remote user to view the video signal from the camera and control the position of a component stage assembly through interactive controls on a user interface.

8. The remote video inspection system described in claim 7 comprising one or more remote viewing interfaces allowing a remote user to view the video without controlling the local hardware system.

9. The remote video inspection system described in claim 1 comprising and a means to automatically reference components on the video with a corresponding Computer Aided Design (CAD) electrical design and schematics wherein the horizontal gimbal is comprised of a gear ring and a horizontal gimbal motor that provides power to the gear ring based on signals received from the video inspection software system.

10. The remote video inspection system described in claim 1 comprising and a means to automatically reference components on the video with a corresponding Computer Aided Design (CAD) electrical design and schematics wherein the outer gimbal is comprised of an outer gimbal motor that is mechanically connected to the outer gimbal motor via an outer gimbal cam and where the outer gimbal motor provides power to the outer gimbal based on signals received from the video inspection software system.

11. The remote video inspection system described in claim 1 comprising and a means to automatically reference components on the video with a corresponding Computer Aided Design (CAD) electrical design and schematics wherein the inner gimbal is comprised of an inner gimbal motor that is mechanically connected to the inner gimbal motor via an inner gimbal cam and where the inner gimbal motor provides power to the inner gimbal based on signals received from the video inspection software system.

12. The remote video inspection system described in claim 11 wherein the local controller is connected via a video connection to the camera and to the horizontal gimbal motor, the outer gimbal motor, and the inner gimbal motor.

13. The remote video inspection system described in claim 11 wherein the remote client with inspection controls allows a remote user to view the video signal from the camera and control the position of a component stage assembly through interactive controls on a user interface.

14. The remote video inspection system described in claim 11 comprising one or more remote viewing interfaces allowing a remote user to view the video without controlling the local hardware system.

* * * * *